United States Patent [19]
Giamportone et al.

[11] Patent Number: 5,676,550
[45] Date of Patent: Oct. 14, 1997

[54] PLATE TECTONIC EARTH PLANET MODEL

[76] Inventors: Joseph S. Giamportone, 5 Windham Loop Apt. 5D, Staten Island, N.Y. 10314; Walter G. Booker, 9 Park St., Spring Valley, N.Y. 10977

[21] Appl. No.: 350,338

[22] Filed: Dec. 6, 1994

[51] Int. Cl.⁶ .................................. G09B 27/08
[52] U.S. Cl. .................. 434/132; 434/134; 434/135; 434/147; 434/130
[58] Field of Search ................... 434/130, 131, 434/132, 134, 135, 136, 137, 147, 299, 276

[56] References Cited

U.S. PATENT DOCUMENTS

| | | |
|---|---|---|
| 3,016,629 | 1/1962 | Case ............................ 434/147 |
| 3,055,124 | 9/1962 | Gilmer, Jr. et al. . |
| 3,618,955 | 11/1971 | Barnes .......................... 434/147 |
| 4,494,935 | 1/1985 | Miller .......................... 434/147 |
| 4,595,367 | 6/1986 | Forsyth ........................ 434/147 |
| 4,627,622 | 12/1986 | Spilhaus ..................... 434/135 X |
| 5,217,226 | 6/1993 | Christopher . |
| 5,226,724 | 7/1993 | Trysiani . |

FOREIGN PATENT DOCUMENTS

0238682  9/1989  Japan ................................. 434/299

*Primary Examiner*—Gene Mancene
*Assistant Examiner*—Jeffrey A. Smith

[57] ABSTRACT

An Earth planet model based on the science of plate tectonics. Accordingly, the model (10) includes a plurality of curved members (12), each curved member representing one of Earth's crustal tectonic plates. Each plate member (12) is formed of a durable, lightweight plastic material and molded in raised and indented relief to illustrate such tectonic features as subduction zones, collision zones, mid-ocean ridges, island chains, island arcs, continental shelves, terrestrial and ocean floor topography, and the like. Plates (12) are attached to the exterior of a base globe (14) forming, as a whole, the surface layer of Earth, or lithosphere. The base globe itself consists of a plurality of spheroidal members, an inner core (22), an outer core (20), and a mantle (18), representing Earth's internal strata. The assembled model is positioned on a supporting pedestal (11) for display or demonstration. The pedestal includes a simple rotary mechanism which allows rotation of the model.

7 Claims, 5 Drawing Sheets

PLATE TECTONIC EARTH PLANET MODEL

BACKGROUND

1. Field of Invention

The present invention relates generally to a model construction, specifically to an innovative Earth planet model based on the principles of plate tectonics.

As used herein, the term "plate tectonics", or "tectonics", refers to the science engaged in the study of Earth's crustal structure and those forces, within the planet, responsible for producing changes in it.

2. Description of Prior Art

Earth planet models have been utilized as research and educational aids, games, toys, amusement devices, and objects of display or reference for decades. Hence, the prior art in this field is diverse and abundant.

Examples of such models include,. but are not limited to, those disclosed in U.S. Pat. Nos. 3,016,629 (Case, 1962); 3,055,124 (Gilmer, Jr, et al, 1962); 3,618,955 (Barnes, 1971); 4,494,935 (Miller, 1985); 4,595,367 (Forsyth, 1986); 5,217,226 (Christopher, 1993); and 5,226,724 (Trusiani, 1993).

The Case patent describes various sets of transparent globe overlays which are mounted over a geographical globe. These overlays are geometrically identical segments designed to illustrate changes in political or national boundaries, geological changes of land masses, plotting of navigational routes, and the like.

In the Gilmer, Jr, et al patent, a base globe is randomly contoured and colored blue to represent the ocean floor. Land mass segments, also contoured in relief and colored to illustrate significant geographical features, are adhered to this base globe. Certain portions of the ocean floor are inscribed to denote continental shelves and subterranean mountain ranges.

The Barnes patent describes a method of making a jig-saw magnetic Earth puzzle, while the Christopher patent includes an atmosphere in its three dimensional, jig-saw puzzle rendition of Earth.

In the Miller patent countries, continents, and other land masses are molded in relief to depict topological features and snapped into place on a globe surface. The areas of the globe surface not covered by land mass segments apparently represent Earth's oceans and seas.

The Forsyth patent describes an instructional globe with numerous embodiments. As with those patents aforementioned, this globe is primarily geographical in design and function. Also, as with other prior art, continents and other land masses are erroneously depicted as separate from and structurally independent of oceans, seas, and each other. Land masses are incorrectly presented as terrestrial segments that lie atop oceans and seas.

In one Forsyth embodiment an attempt is made to present the internal strata of Earth. A portion of the inner core, outer core, and mantle are illustrated on a flat "quarter disc" mounted inside a transparent globe apparatus. Other Earth globe models also attempt to convey the essence of Earth's internal strata through the use of labelled illustrations on flat surfaces as in books, magazines, and other such printed publications. Unfortunately, these two dimensional representations are erroneous in design and, therefore, misleading and confusing. Firstly, Earth's internal strata are three dimensional structures and should be represented as such. Secondly, the significance of these strata (that they are the structures responsible for all crustal activity), is ignored or disregarded. Consequently, there are no connections drawn between the dynamics of the surface layer of Earth and the internal forces driving tectonic plate movement and crustal activity.

These deficiencies, flaws, and disadvantages of the prior art, herein described, render previous Earth globe models inaccurate, incomplete, and, therefore, inferior to the present invention as will become apparent in the following descriptions.

OBJECTS AND ADVANTAGES

The science of plate tectonics has revealed the true nature of Earth's crustal structure and internal strata.

Contrary to what has been described in the above prior art, Earth's crust is neither a jig-saw puzzle nor a set of geometrically identical segments. Continents are neither separate from nor structurally independent of oceans, seas, and each other. Also, land masses do not sit atop oceans and seas.

According to the principles of plate tectonics Earth's crust is a fluid mosaic of many irregular rigid segments, or plates. These plates drift about slowly, yet steadily, in different directions atop a much hotter and softer layer of Earth's mantle, the athenosphere. These enormous blocks of Earth's crust vary in size and shape, and have definite borders that cut through continents and oceans alike. Where plates converge mountains and volcanos are often found. Oceans are born and grow wider where plates pull apart. Earthquakes are the result of plates grinding and slipping past each other. The energy responsible for these tectonic plate shifts, drifts, collisions, and interactions originate deep in Earth's inner core and is manifest in the outer core/mantle dynamics. These and all other plate tectonic principles are the foundation of the present invention.

Accordingly, it is one object of the present invention to provide an innovative scale construction model of Earth which includes as part of its ensemble a number of three dimensional spheroidal members representing Earth's internal strata including, but not limited to, an inner core, an outer core, and a mantle. When assembled these members form a polyspheroidal, concentric, globe shaped body, or base globe.

It is another object of the present invention to provide a plurality of curved members, each member representing one of Earth's crustal tectonic plates. When all of these curved members are fastened, attached, adhered, or mounted to the exterior of the base globe they represent, as a whole, the surface layer of Earth, or lithosphere.

It is a further object of this invention to design and mold each curved member in striking raised and indented relief to depict and illustrate clearly such tectonic features as: terrestrial and ocean floor topography; continental shelves; mid-ocean ridges; island chains; island arcs; subduction zones; collision zones; the relative thickness of ocean floor and continental crust; common boundaries between plates; and the like.

It is a further object of the present invention to provide a supporting pedestal upon which the Earth model can be mounted securely but not permanently attached. This portability will allow for the model to be easily removed from the pedestal or positioned in a variety of ways on the pedestal to facilitate examination or study of the model. The pedestal can also be used as a means of support for the model during assemblage.

It is another object of the present invention to provide the pedestal with a simple rotary mechanism in its design. This would allow either battery powered or manual rotation of the Earth model about Earth's polar axis. Furthermore, the pedestal can be designed so that its rotating surface is inclined so as to simulate the traditional 23 degree tilt of Earth's polar axis with respect to the solar ecliptic plane.

The science of plate tectonics has brought a sweeping revolution in our understanding of Earth, and a new grasp of the forces that shape it. The present invention, because of its unique design and novel construction, is an ideal vehicle for transforming the complexities of plate tectonics into an enjoyable, tactile educational experience for the general public.

It is, therefore, another outstanding object of the present invention to provide an affordable, durable, informative, attractive, and enduring plate tectonic Earth planet model suitable for assembly by children, adults, families, students, hobbyists, etc.

Plate tectonics is quickly becoming the unifying, or central, theme of Earth science and geology school curriculum across the nation and, indeed, around the world.

A further object of this invention, therefore, is to provide an outstanding hands-on, minds-on, plate tectonic Earth planet model educational aid and reference tool for teachers and students at all levels of instruction.

These and other objects, advantages, and features of the present invention will become apparent from a consideration of the drawings and descriptions that follow.

DRAWINGS FIGURES

In the drawings, closely related figures have the same number but different alphabetic suffixes.

Reference Numerals in Drawings

| | | | |
|---|---|---|---|
| 10 | fully assembled model | 11 | supporting pedestal |
| 11A | pedestal base | 11B | upper concave pedestal seat |
| 12 | tectonic plate curved members | 14 | base globe |
| 16 | plate interfaces | 16A | etched cues on base globe |
| 18 | assembled mantle | 18U | upper mantle hemisphere |
| 18L | lower mantle hemisphere | 20 | assembled outer core |
| 20U | upper outer core hemisphere | 20L | lower outer core hemisphere |
| 21 | inner core/outer core sub-assembly | | |
| 22 | assembled inner core | 22U | upper inner core hemisphere |
| 22L | lower inner core hemisphere | 24 | hardening foam material |
| 26 | adhesive agent | 28 | ferromagnetic elements |
| 30 | inner core mounting grooves | 30A | outer core mounting grooves |
| 30B | mantle mounting grooves | 32 | equatorial plane |
| 34A | outer core indentations | 34B | mantle indentations |

DESCRIPTION

FIGS. 1A to 7C

Figure 1A:
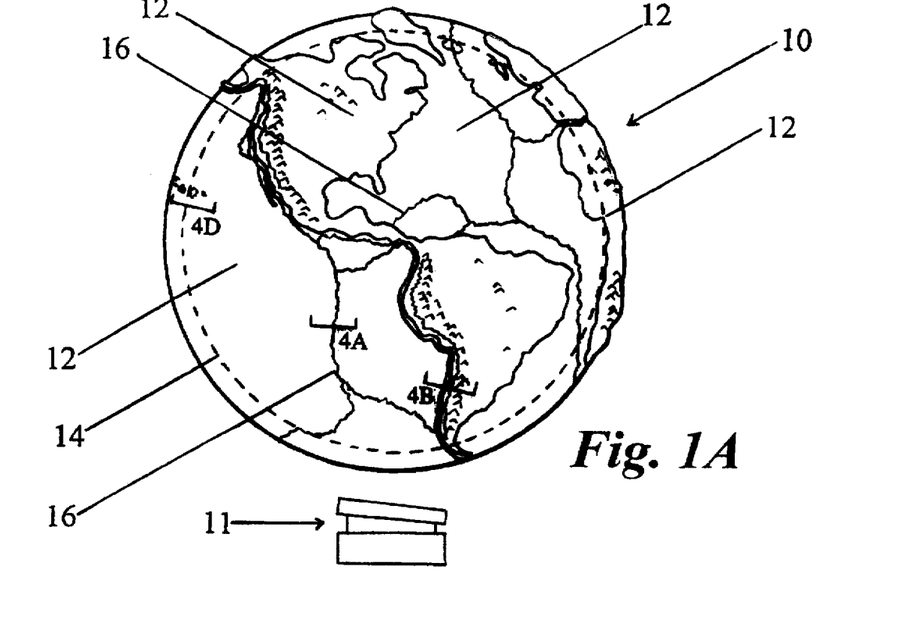
FIGS. 1A and 1B show two different perspective views of a fully assembled model with supporting pedestal.
Figure 1B:
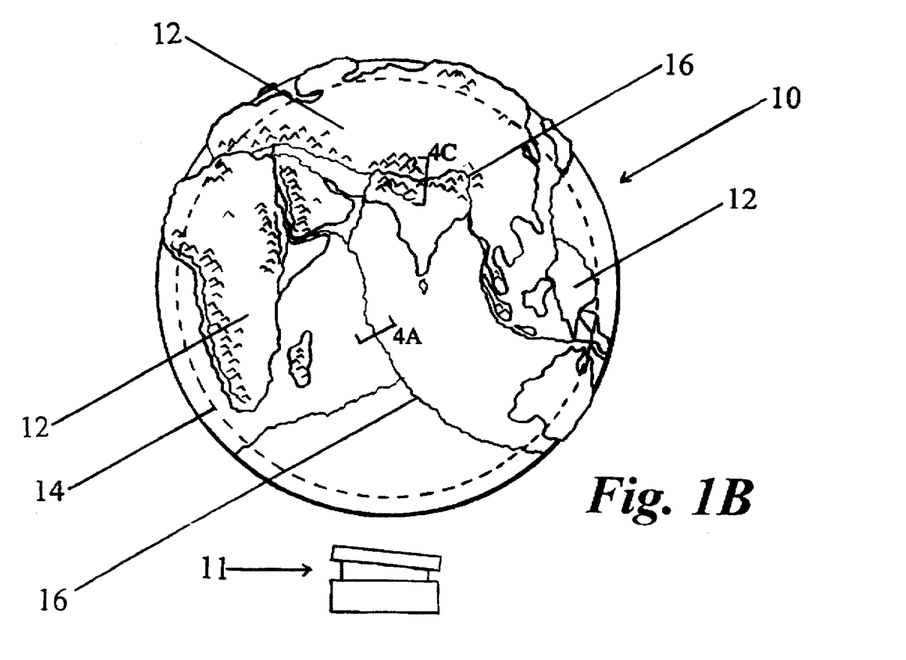

Referring specifically to the drawings, FIGS. 1A and 1B show different perspective views of a fully assembled plate tectonic Earth planet model, or model 10, with a supporting pedestal 11. Tectonic plate curved members, or plates 12, are shown in their respective positions on a globe shaped body, or base globe 14. Common boundaries between plates, or plate interfaces 16, are also delineated. Section FIGS. 4A, 4B, 4C, and 4D are also shown. Details of the plate interfaces, along with details of plate relief, relative thickness of ocean floor and continental crust, and various methods of attaching plates 12 to base globe 14 are called out and shown in section in FIGS. 4A, 4B, 4C, 4D, 5A, 5B, 5C, 5D, and will be described below.

Figure 2:
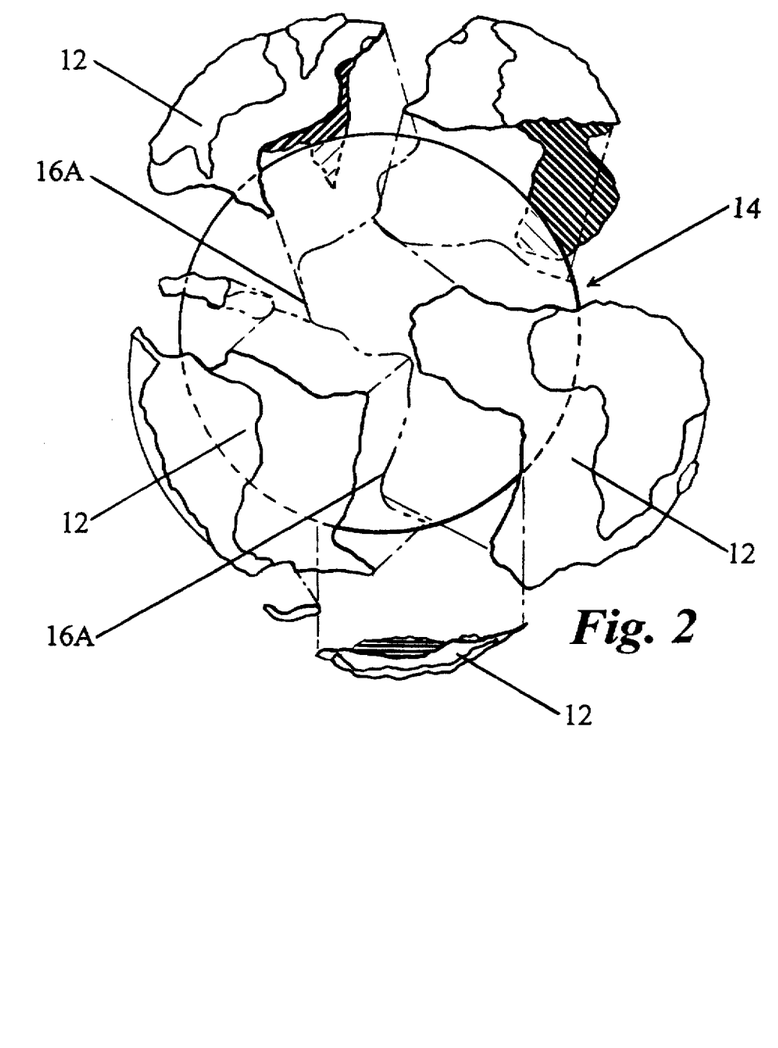
FIG. 2 shows a partial blow apart perspective view of a model.
Figures 6A, 6B, 6C:
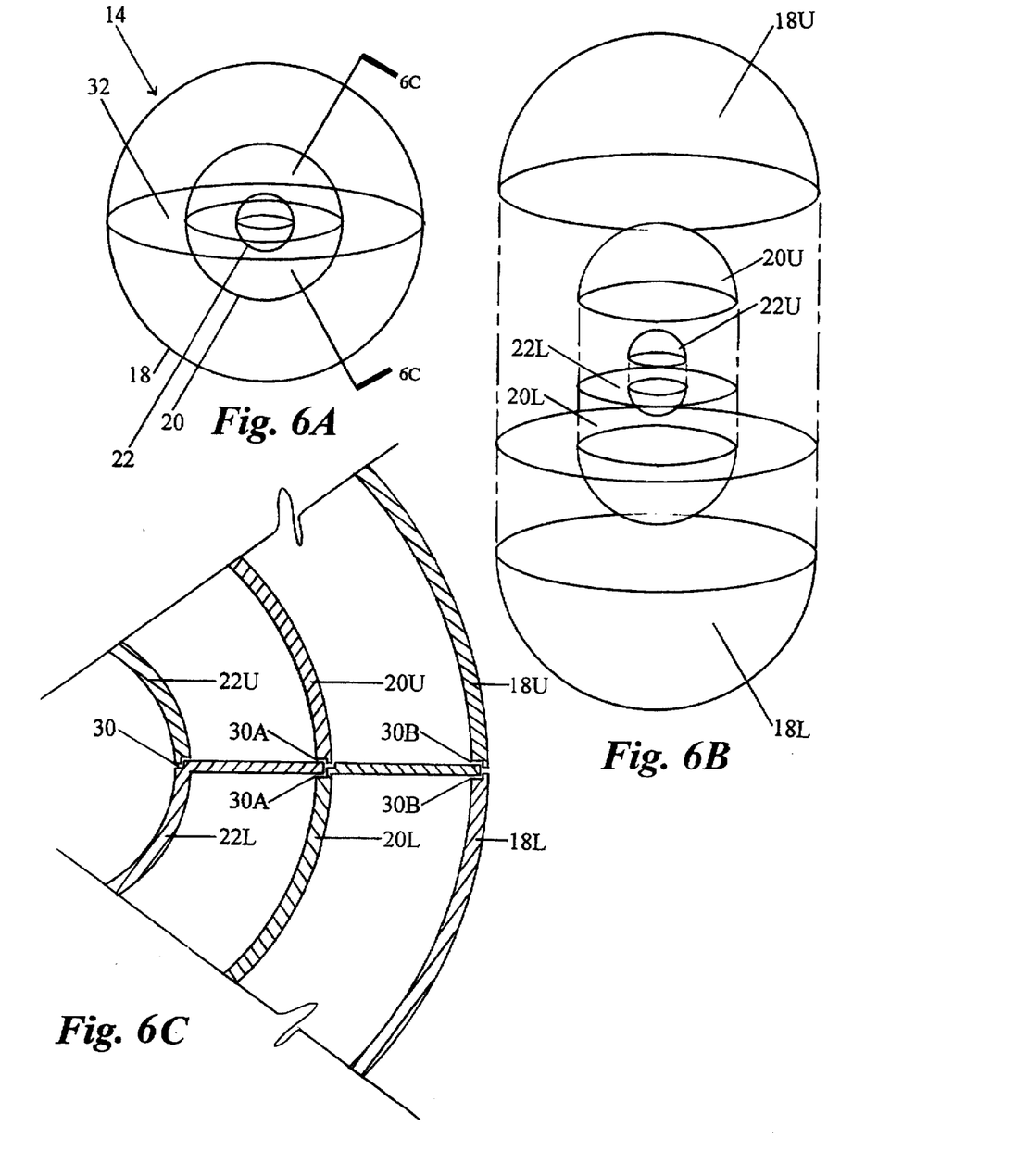
FIG. 6A shows a perspective view of transparent inner strata construction.
FIG. 6B shows a blow apart view of transparent inner strata construction.
FIG. 6C shows a partial cross section along line 6C—6C of FIG. 6A through transparent inner strata members illustrating equatorial disc details.
Figures 7A, 7B, 7C:
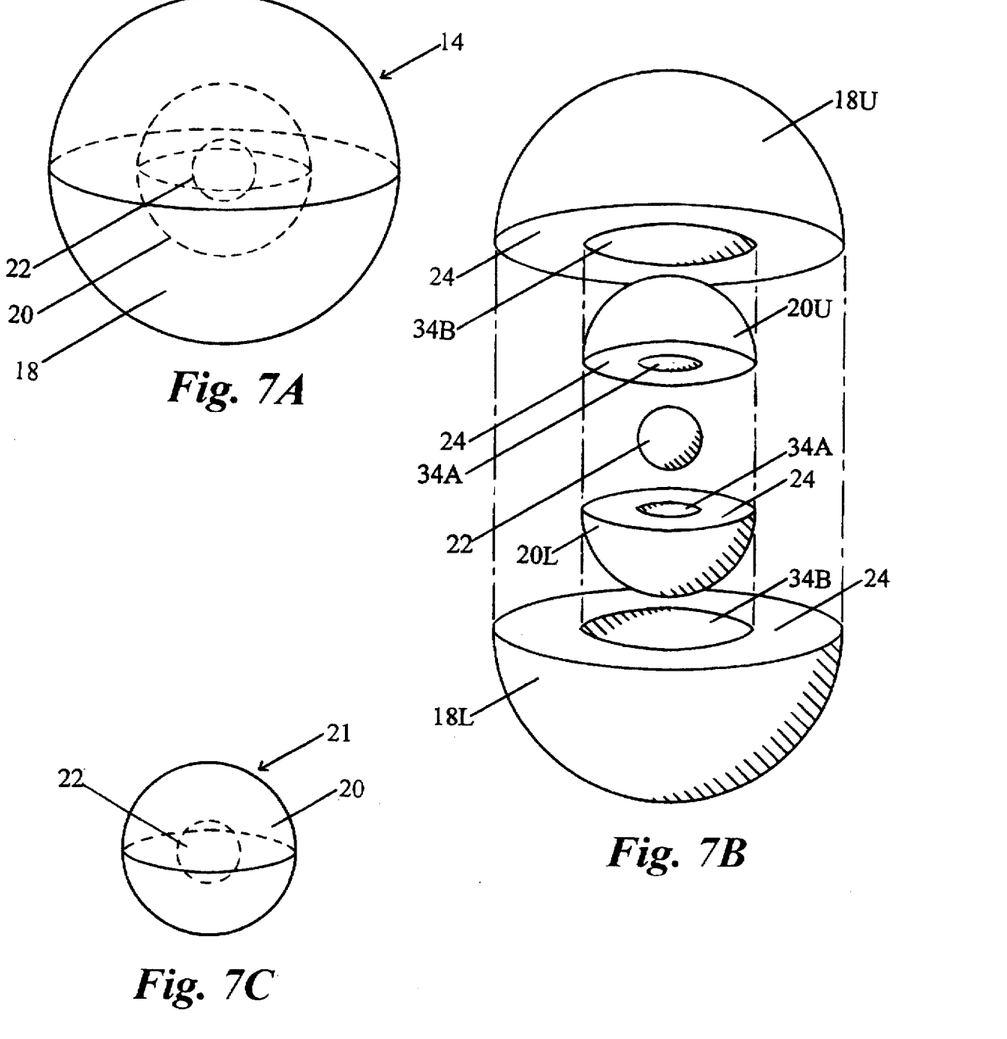
FIG. 7A shows a perspective view of solid inner strata construction.
FIG. 7B shows a blow apart view of solid inner strata construction.
FIG. 7C shows a perspective view of the inner core/outer core sub-assembly.

FIG. 2 is a partial blow apart perspective view of model 10 showing the general shapes, or configurations, of plates 12, and their conformance to base globe 14. Plates 12 are designed so that the inside radius of curvature of each plate equals the outside radius of curvature of the base globe. Referring to FIGS. 6A and 7A, base globe 14 is comprised of concentric spheroidal members representing Earth's internal strata including an inner core 22, an outer core 20, and a mantle 18. Assemblage of the base globe will be described in detail in FIGS. 6A, 6B, 6C, 7A, 7B, and 7C.

FIGS. 4A to 4D, and FIGS. 5A to 5D illustrate the three dimensional relief characteristics of various types of plate interfaces, terrestrial and ocean floor topography, and the relative thickness of oceanic and continental crust. These are outstanding and distinguishing advantages of the present invention over the prior art and are, therefore, described in further detail below.

Figure 4A:
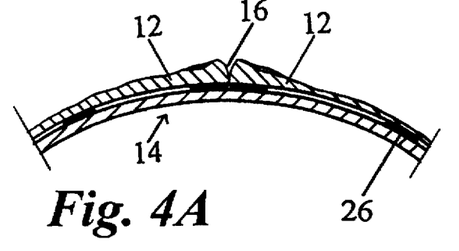
FIG. 4A shows detailed section along line 4A—4A of FIG. 1B through plate interface after attachment of plates to base globe.
Figure 5A:
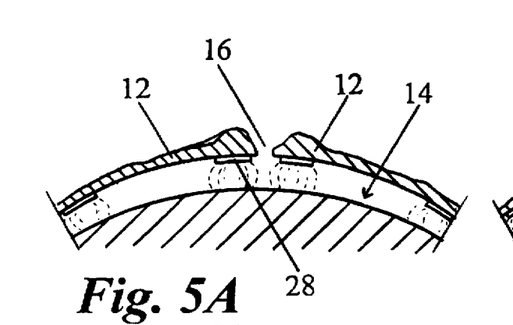
FIG. 5A shows detailed section along line 4A—4A of FIG 1B through plate interface before attachment of plates to base globe.

FIGS. 4A and 5A are detailed illustrations of a type of plate interface known as a mid-ocean ridge.

At a mid-ocean ridge two plates have been moving away, or diverging, from each other all along their interface for many, many millennia. These are the zones of what is commonly known as sea floor spreading. Mid-ocean ridges are characterized by a deep valley, or rift, curing through two enormous lava mountain ridges spanning the entire length of the interface.

Referring to FIG. 1A, one example of a mid-ocean ridge is the boundary shared by the southeastern edge of the Pacific plate and the western edge of the Cocos plate (Section FIG. 4A). Referring to FIG 1B, another example of a mid-ocean ridge is the boundary shared by the eastern edge of the African plate and the western edge of the Indo-Australian plate (Section FIG. 4A). FIG. 5A shows plates 12 before attachment to base globe 14. FIG. 4A shows plates 12 attached to base globe 14 via an adhesive agent 26, and abutting each other at interface 16. Details of a mid-ocean ridge, including valley and adjacent mountain ridges, are clearly illustrated.

Figure 4B:
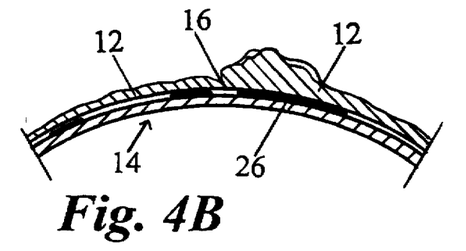
FIG. 4B shows detailed section along line 4B—4B of FIG. 1A through plates interface after attachment of plates to base globe.
Figure 5B:
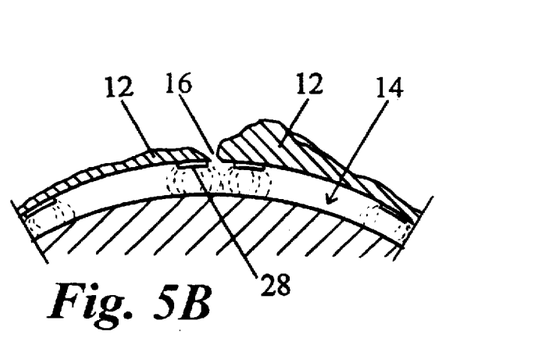
FIG. 5B shows detailed section along line 4B—4B of FIG. 1A through plate interface before attachment of plates to base globe.

FIGS. 4B and 5B are detailed illustrations of another type of plate interface known as a subduction zone.

At a subduction zone two plates are moving into each other, or converging. The leading edge of one plate is oceanic crust while the leading edge of the other plate is continental crust. Oceanic crust is thinner and more dense than continental crust. Consequently, when these plates converge, or collide, the oceanic crust plows under, or subducts, the continental crust. Ninety-five percent of Earth's volcanoes and earthquakes occur along these subduction zones.

Referring to FIG. 1A, one example of a subduction zone is the boundary shared by the eastern edge of the Cocos plate and the western edge of the South American plate (Section FIG. 4B). Here, the Cocos plate is subducting the South American plate. FIG. 5B shows plates 12 before attachment to base globe 14. FIG. 4B shows plates 12 attached to base globe 14 via adhesive agent 26, and abutting each other at interface 16. Details of a subduction zone, including leading edge relief of both plates, are clearly illustrated. FIGS. 4B and 5B also depict the relative thickness of continental crust as compared to oceanic crust.

Figure 4C:
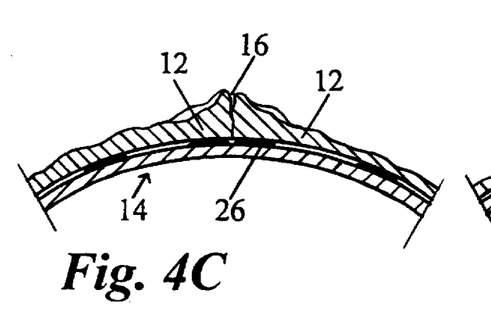
FIG. 4C shows detailed section along line 4C—4C of FIG. 1B through plate interface after attachment of plates to base globe.
Figure 5C:
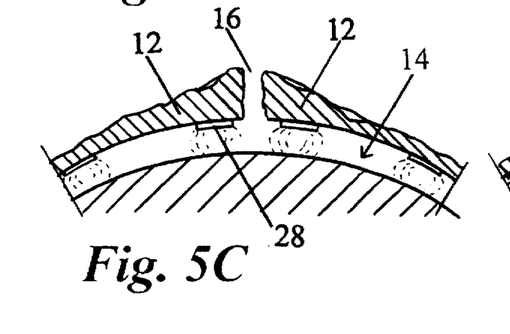
FIG. 5C shows detailed section along line 4C—4C of FIG. 1B through plate interface before attachment of plates to base globe.

FIGS. 4C and 5C are detailed illustrations of yet another type of plate interface known as a collision zone.

At a collision zone two plates, whose leading edges are both continental crust, collide. When this happens the land comprising the leading edge of both plates buckles, twists, folds, and gets thrust up at the interface. Over time, this buckling land forms terrestrial mountain ranges. This is how the Himalayas, Rockies, Alps, Andes, and other continental mountain ranges have been formed.

Referring to FIG. 1B, one example of a collision zone is the boundary shared by the northern edge of the Indo-Australian plate and a southern edge of the Eurasian plate (Section FIG. 4C). This tectonic collision has resulted in the formation of the Himalaya mountain range. FIG. 5C shows plates 12 before attachment to base globe 14. FIG. 4C shows plates 12 attached to base globe 14 via adhesive agent 26, and abutting each other at interface 16. The three dimensional terrestrial relief of the present invention is clearly illustrated in all figures.

Figure 4D:
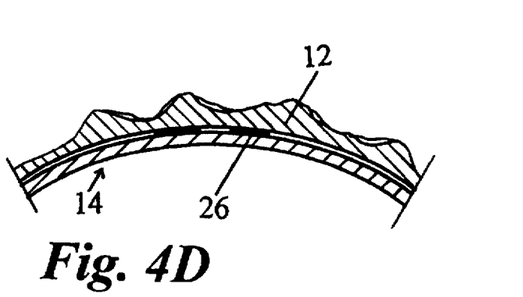
FIG. 4D shows detailed section along line 4D—4D of FIG. 1A through Hawaiian island chain after attachment of plate to base globe.
Figure 5D:
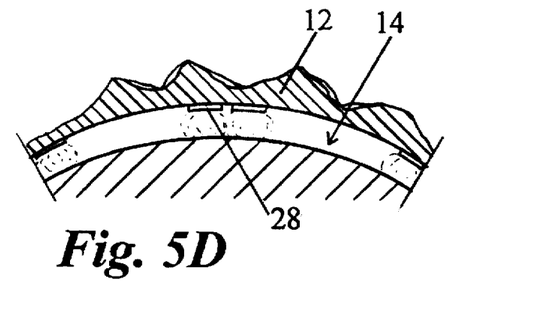
FIG. 5D shows detailed section along line 4D—4D of FIG. 1A through Hawaiian island chain before attachment of plate to base globe.

Another outstanding feature and advantage of the present invention is the detailed relief of ocean and sea floor topography. FIGS. 4D and 5D are detailed illustrations of a typical ocean floor feature of the present invention, an island chain. Island chains are formed when magma from within the earth escapes through a "hot spot" in Earth's mantle. If oceanic crust lies over this hot spot, escaping magma is thrust up through a weak spot in Earth's crust. Over time, undersea volcanoes evolve and if the crust is thrust up far enough, the peak of the volcano emerges from below the ocean's surface to form a volcanic island. As the plate drifts over the hot spot, new islands are born as old islands drift off the hot spot. In time, what arises is a string of islands, or island chain.

Referring to FIG. 1A, one example of an island chain is the Hawaiian Island chain (Section FIG. 4D), which is found near the middle of the enormous Pacific plate. FIG. 5D shows the region of the Pacific plate harboring the Hawaiian island chain before attachment to base globe 14. FIG. 4D shows this same region attached to base globe 14 via adhesive agent 26.

FIGS. 4D and 5D illustrate the degree of ocean and sea floor topographical relief typical of the present invention.

The illustrations, details, and explanations described in FIGS. 4A to 5D have been set forth for the purposes of making a complete disclosure of the invention. There are other types of plate interfaces and plate characteristics, as well as numerous other ocean floor and terrestrial topographical features embodied in the present invention. Therefore, the scope of the present invention includes, but is not limited to, the features described in FIGS. 4A to 5D.

First Embodiment

In one preferred embodiment of the present invention, plate members and inner strata members are formed of durable plastic material from the group consisting of plastic polymer compounds. With respect to the plates, they etched, frosted, or otherwise treated. This would serve to differentiate the ocean and sea floor areas of the plates from the continental and other land mass areas of the plates. Model builders would be encouraged to paint the continents and land masses. This would actively engage the model builder while enhancing the aesthetic value of the assembled model. Referring to FIG. 2, each plate 12 is positioned over a predetermined part of base globe 14 made apparent through the use of an etched cue 16A on the exterior of base globe 14. Plates 12 could be permanently attached to base globe 14 through the use of model glue, paste, or other such adhesive agent 26, as illustrated in FIGS. 4A, 4B, 4C, and 4D.

Referring to FIG. 6A, with respect to base globe construction, inner core 22, outer core 20, and mantle 18 members are hollow, concentric spheres formed of durable, transparent plastic material. Section FIG. 6C is also shown. The inner core consists of an upper hemisphere member 22U and a lower hemisphere member 22L as shown in FIG. 6B. These inner core hemisphere members 22U and 22L seat, mate, or are joined together at a routed groove 30 as shown in FIG. 6C. Referring to FIG. 6B, the outer core consists of an upper hemisphere member 20U and a lower hemisphere member 20L. The mantle, similarly, consists of an upper hemisphere member 18U and a lower hemisphere member 18L. Lower inner core hemisphere 22L is integral with a supporting disk that has a diameter approximately 3 millimeters (⅛ of an inch) greater than the inner diameter of upper and lower outer core hemispheres 20U and 20L. Lower outer core hemisphere)20L is integral with a supporting disk that has a diameter approximately 3 millimeters (⅛ of an inch) greater than the inner diameter of upper and lower mantle hemispheres 18U and 18L.

This construction allows the integral disk of lower inner core hemisphere 22L to bear, or seat, in a routed groove 30A formed around the inner circumference of upper and lower outer core hemispheres 20U and 20L as shown in FIG. 6C. Similarly, the integral disk of lower outer core hemisphere 20L will seat in a routed groove 30B formed around the inner circumference of upper and lower mantle hemispheres 18U and 18L as shown in FIG. 6C. Consequently, the hemispheres and disks, once assembled and adhesively bonded together, will form a concentric base globe structure depicting Earth's inner core 22, outer core 20, and mantle 18, with an integral equatorial plane 32, as shown in FIG. 6A.

Inner core and outer core members could be tinted, painted, or formed in relief to differentiate them from each other. With the base globe assembled and the plates attached, the transparent, pale blue ocean and sea floors of the plates would serve as windows into the interior of the model. Referring back to FIGS. 1A and 1B, assembled model 10 is positioned on supporting pedestal 11 for display or demonstration.

Figure 3:
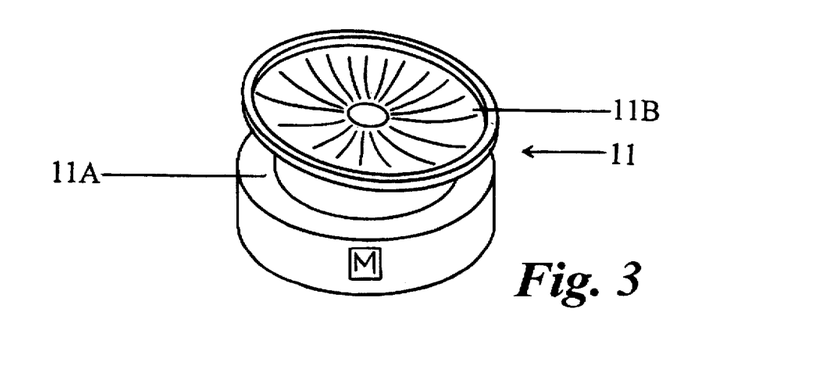
FIG. 3 shows a perspective top view of supporting pedestal.

Referring to FIG. 3, pedestal 11 is formed of durable plastic material and includes a lower cylindrical base 11A and an upper concave platform, or seat 11B. Pedestal 11 also includes a conventional electric or manual mechanism (not shown) for rotation of upper seat 11B. The pedestal can be inclined so as to simulate the 23 degree tilt of Earth's polar axis with respect to the solar ecliptic plane as shown in FIG. 3.

Second Embodiment

In another preferred embodiment of the present invention, the model could be designed as a readily assembled or disassembled structure. Referring to FIGS. 5A, 5B, 5C, and 5D, plates 12 are formed of durable plastic material with a ferromagnetic element 28 adhered and conforming to the concave inner surfaces of the plates. This would allow the plates to be easily attached or detached from the exterior surface of base globe 14, which in this embodiment is formed of a thin ferrous material. The structure and assemblage of the base globe in this embodiment is described in FIGS. 7A, 7B, and 7C.

Referring to FIG. 7A, inner core member 22 is a solid spherical structure manufactured in red, orange, or other such color, and made of a higher density material than outer core 20 and mantle 18 members. This would convey the notion of a hot, dense inner core. Referring to FIG. 7B, the outer core would consist of upper hemisphere 20U and lower hemisphere 20L. The mantle would similarly consist of upper hemisphere 18U and lower hemisphere 18L. Outer core hemispheres 20U and 20L are made of a rigid, lightweight, plastic material and filled with a hardening, low density foam, rubber, or other such material 24. A hemispherical indentation 34A, with the same diameter as solid inner core member 22, is then formed at the center of both filled outer core hemispheres 20U and 20L. Both outer core hemispheres 20U and 20L are then joined, with solid inner core 22 positioned tightly between them, forming an inner core/outer core sub-assembly 21 as shown in FIG. 7C. Referring back to FIG. 7B, mantle hemispheres 18U and 18L are made of a lightweight, yet rigid, ferrous material and are filled with foam 24 and a hemispherical indentation 34B formed at both of their centers. The diameter of hemispherical indentations 34B are equal to the diameter of inner core/outer core sub-assembly 21. Mantle hemispheres 18U and 18L are then joined with inner core/outer core sub-assembly 21 positioned tightly between them to form a solid, concentric, polyspherical base globe 14 (FIG. 7A). The tight fit of the various members of this base globe keeps the base globe intact, or together, yet allows for the base globe to be disassembled and the internal strata to be handled, examined, studied, etc. Plates could also be removed from the base globe, permitting a close examination of the structure, relief, shape, configuration, or composition of various plates. Referring back to FIGS. 1A and 1B, assembled model 10 is mounted on pedestal 11 for support and display.

SUMMARY, RAMIFICATIONS, AND SCOPE

Thus, the reader will see that the plate tectonic Earth planet model of this invention provides an outstanding tool, device, or instrument for conveying, or teaching, the principles of plate tectonics to children and parents, students and educators, or hobbyists of all ages. Outstanding Advantages and features of the present invention are: (1) Earth's outer crust is represented by a plurality of curved members, or pieces, which are molded to illustrate the actual shape, or configuration, of Earth's tectonic plates according to current scientific knowledge in the field; (2) The comprehensive, elaborate, three dimensional relief architecture of each tectonic plate member is a common feature and distinguishing advantage of this invention over the prior art; (3) Earth's internal strata are represented as three dimensional concentric structures, underscoring the significance of Earth's internal structures as well as Earth's external topography; (4) The tactility of the model is a clear and qualified advantage. Tectonic plate members and inner strata members can be tactually inspected as individual structures, in sub-assembly form, in relation to each other, etc.; (5) Decals or other such indicia can be utilized to identify individual plates, land masses, oceans, seas, cities, lines of latitude and longitude, significant tectonic zones, geographical features, and the like; (6) An illustrated guide to plate tectonics can be provided to assist in the construction of the model and serve as a roadmap to an understanding of the dynamics of plate tectonics.

Also, it should be understood, as stated herein, that as of the writing of this application, plate tectonics is a relatively new science. Therefore, any future discoveries or conclusions drawn from data analysis related to plate boundaries, plate configuration, plate dynamics, plate relief, internal strata, and the like, would be incorporated into the design and construction of the present invention, and inherently embodied in the scope of this invention.

While our above description contains many specificities, these should not be construed as limitations on the scope of the invention, but rather as an exemplification of two preferred embodiments, thereof. Numerous other variations are possible. For example, plates can be formed of any appropriate durable material including plastic, rubber, etc. Plates can be manufactured in any color, painted or tinted in any color, etc. The pedestal can include a simple battery powered mechanism to provide internal illumination. With transparent plates, this will illuminate the interior of the model. With opaque or painted plates, illumination would be visible only through the plate interfaces. The model could be made part of a geology or geography game, or other such activity.

The foregoing embodiments of the present invention have been set forth in considerable detail for the purposes of making a complete disclosure of the invention. It may be apparent, however, to those skilled in the art that numerous changes may be made in such details without departing from the spirit and principles of the invention. The invention is, therefore, claimed in any of its forms or modifications within the proper scope of the appended claims appropriately interpreted in accordance with the doctrine of equivalents.

We claim:

1. An earth planet model, comprising:
   a. a globe shaped body having a convex outer surface;
   b. a plurality of curved members representing earth's crustal tectonic plates, the outer edge of each of said plurality of curved members being in the shape of the tectonic plate represented thereby, each of said plurality of curved members having a convex outer surface and a concave inner surface, the inside radius of curvature of each curved member equals an outside radius of curvature of said globe shaped body to allow conformance of said concave inner surface of each curved member to said convex outer surface of the globe shaped body;
   c. adhering means for enabling attachment of each of said plurality of curved members to said convex outer surface of said globe shaped body at pre-established positions;
   d. a supporting pedestal including cradling means for enabling said globe shaped body with attached said plurality of curved members to be positioned on said supporting pedestal; and
   e. a plurality of three dimensional spheroidal members of varying pre-determined diameters, said spheroidal members representing earth's internal strata, connecting means for enabling said spheroidal members to be concentrically joined together in a pre-established manner, thereby forming a three dimensional, concentric, polyspheroidal structure.

2. The earth planet model as defined in claim 1, wherein said plurality of curved members are formed of a durable material, each curved member is molded in raised and indented relief to depict earth's numerous tectonic features, whereby, as a whole, the curved members, when attached to the globe shaped body, form an accurate, three dimensional representation of earth's outer crust.

3. The earth planet model as defined in claim 2, wherein said durable material is transparent and selected from the group consisting of plastic polymer compounds, each of said plurality of curved members and the outer surface of said globe shaped body are treated with an adhesive agent, said means for enabling attachment of each curved member comprising an adhering bond formed between said curved members and said globe shaped body, whereby the curved members are permanently attached to the globe shaped body.

4. The earth planet model as defined in claim 2, wherein said durable material is opaque and selected from the group consisting of plastic polymer compounds, each of said plurality of curved members have a ferromagnetic element attached to their concave inner surface and said outer surface of said globe shaped body is formed of a ferrous material, said adhering means for attaching each curved member comprising the magnetic attraction between said ferromagnetic elements attached to curved members and said ferrous material of the globe shaped body, whereby said plurality of curved members can be removably attached to said globe shaped body.

5. The earth planet model as defined in claim 1, wherein said plurality of spheroidal members are hollow and formed of a durable, transparent material selected from the group consisting of plastic polymer compounds, said connecting means enabling said plurality of spheroidal members to be non-detachably joined together.

6. The earth planet model as defined in claim 1, wherein said plurality of spheroidal members are formed of a durable material selected from the group consisting of plastic polymer compounds, said connecting means enabling said plurality of spheroidal members to be detachably joined together.

7. The earth planet model as defined in claim 1, wherein said supporting pedestal is formed of a durable material selected from the group consisting of plastic polymer compounds, said pedestal comprises a lower base and an upper concave seat, said cradling means consists of said upper concave seat, said pedestal further includes a revolving means for enabling said upper concave seat to rotate in relation to said base.

* * * * *